April 11, 1961 W. F. STEAGALL 2,979,697

DELAY ELEMENT AND CIRCUITS EMBODYING THE SAME

Filed Nov. 17, 1954 4 Sheets-Sheet 1

INVENTOR

WILLIAM F. STEAGALL

BY Emery Light

ATTORNEY

INVENTOR

WILLIAM F. STEAGALL

BY

E Jerry Light

ATTORNEY

April 11, 1961 W. F. STEAGALL 2,979,697

DELAY ELEMENT AND CIRCUITS EMBODYING THE SAME

Filed Nov. 17, 1954 4 Sheets-Sheet 3

INVENTOR

WILLIAM F. STEAGALL

BY [signature]

ATTORNEY

April 11, 1961 W. F. STEAGALL 2,979,697
DELAY ELEMENT AND CIRCUITS EMBODYING THE SAME
Filed Nov. 17, 1954 4 Sheets-Sheet 4

INVENTOR
WILLIAM F. STEAGALL
BY
ATTORNEY 2,979,697

DELAY ELEMENT AND CIRCUITS EMBODYING THE SAME

William F. Steagall, Merchantville, N.J., assignor to Sperry Rand Corporation, a corporation of Delaware Filed Nov. 17, 1954, Ser. No. 469,377

27 Claims. (Cl. 340—174)

This invention relates to delay elements and circuits employing the same. The invention also relates to an electrical circuit that may take the form of a delay flop or of a multivibrator. In fact it may by modification be adapted to various forms of electrical devices.

It is desirable in a computer circuit to employ a delay flop for purposes that are well known in the art. In the past, delay flops have employed vacuum tubes and other similar devices which have had certain disadvantages. An example of one of these disadvantages is the lack of requisite reliability of operation in that vacuum tubes are likely to burn out. Moreover, in connection with computing systems employing magnetic amplifiers throughout, it is desirable to have a delay flop which is compatible with the remainder of the system. Prior art fails to disclose such a delay flop. There are, however, certain prior copending applications of the same assignee as the present application wherein delay flops embodying magnetic amplifiers have been disclosed. One such application is that of Henry William Kaufmann, Serial No. 453,981, filed September 3, 1954, now Patent No. 2,812,448, entitled "Delay Flop." That application contemplates both resettable and non-resettable delay flops. In one form of that disclosure, as many magnetic amplifiers are required as there are output pulses. In another form of the invention only two magnetic amplifiers are required, but the circuit has disadvantages which are overcome by the circuit of the present invention.

In the aforesaid Kaufmann application, the delay means is in the form of a condenser. There are certain limitations upon this form of delay means which it is desirable to overcome. It is the primary object of this invention to provide a delay flop which overcomes the disadvantages hereinabove enumerated.

Still another object of the invention is to provide a delay flop that is an improvement over the aforesaid disclosure of Henry William Kaufmann in that the apparatus is more accurate and effective in its operation.

It is yet another object of the invention to provide a delay flop that is low in cost yet effective.

An additional object of the invention is to provide a delay flop of small physical size as compared with the delay flops of the prior art.

The prior art discloses a multitude of delay elements but all of these have certain disadvantages. While the prior art has disclosed delay elements of exceptional accuracy, others of low cost, others of small size, etc. there is no delay element that has the low cost, small size and fair degree of accuracy that is desired in connection with the circuits herein disclosed. It is an object of this invention to produce an improved delay element which considering the required degree of accuracy has the low cost, small size and other advantages inherent in the delay element hereinafter disclosed.

It is a further object of the invention to provide an improved delay element for use in any form of electrical circuit where delaying means is required.

It is another object of the invention to provide a delay element of small size that is very accurate and reliable in operation.

An additional object of the invention is to provide a delay element of improved reliability which is lower in cost than those now available.

While the prior art contains a multitude of multivibrators, none of them are well suited for computer circuits employing magnetic amplifiers throughout. One object of this invention is to provide such a multivibrator.

Another object of this invention is to provide an electrical circuit operating on a new principle and which is widely useful in computer circuits employing magnetic amplifiers. The broad concept underlying this new circuit hereinafter appears in two illustrative forms, one form being a delay flop and another being a multivibrator.

In carrying out the aforesaid objects, I provide a pair of complementing magnetic amplifiers in which the output of each amplifier controls the input to the other. The circuit feeding the output of the second amplifier to the input of the first amplifier has two branches, one of which allows current to flow immediately from the output of the second amplifier to the input of the first. This causes a recycling operation by the two magnetic amplifiers, characterized by a series of pulses at the output of the delay flop. The other branch feeding current from the output of the second magnetic amplifier to the input of the first includes my improved delay element, and after a predetermined time has elapsed following the application of current to the input of the delay element, the delay current arrives at the input of the first magnetic amplifier and cancels the input which passed thereto through the first-named branch. As a result, the input to the first magnetic amplifier is effectively zero and as it is a complementing magnetic amplifier it is cut off. Hence, the recycling operation is stopped. The principle just explained is hereinafter illustrated in two forms, one in a circuit operating as a delay flop and one in a circuit operating as a multivibrator.

My improved delay element comprises a source feeding current through a resistor and a rectifier. In the specific embodiment hereinafter described, the anode of the rectifier is connected to ground and the cathode remains substantially at ground potential, while current from the aforesaid source is flowing therethrough. The delay element comprises an inductor (which may or may not have substantial resistance), having an input end connected to the circuit which supplies the pulse to be delayed, and an output connected to said cathode. When a positive pulse is fed to the input of the inductor, current in the latter will build up slowly, and until that current builds up to a value equal to the current flowing through the rectifier from said first-named source, the rectifier will hold its cathode at substantially ground potential. However, after a predetermined time period, the pulse or pulses entering the inductor will raise the potential of the cathode of said rectifier to a positive value and current will then appear in the output of the delay element.

The foregoing brief description of two of the features of this invention will be hereinbelow described in detail.

Figure 1:
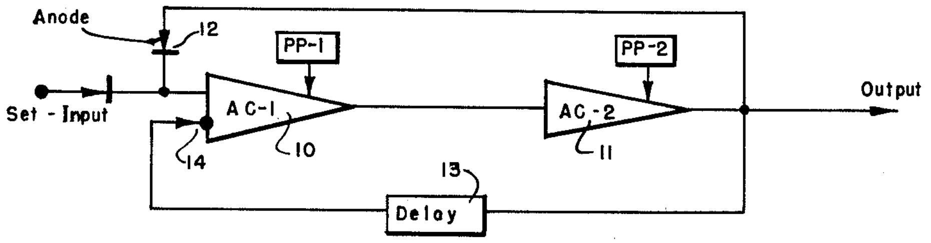
Figure 1 is a block diagram of one of the preferred forms of my delay flop circuit.

Referring to Figure 1, it is noted that there are two generators of power pulses of opposite phase designated as PP–1 and PP–2. These generators both generate a series of spaced power pulses with the pulses of one generator appearing during the spaces between pulses of the other generator, as shown in Figure 3. The two complementing magnetic amplifiers AC1 and AC2 are of a type which, in response to an input pulse occurring in the space between power pulses fed thereto, will stop the flow of power pulses from the source (PP–1 or PP–2 as the case may be) to the output of the magnetic amplifier. That is to say, normally, in the absence of any input to the magnetic amplifier, pulses from the source PP–1 flow through magnetic amplifier 10 to the input of magnetic amplifier 11. Likewise, in the absence of an input signal to the magnetic amplifier 11, the power pulses from source PP–2 flow through the magnetic amplifier 11 to the output. However, in each case, in the event that an input signal arrives at the magnetic amplifier during the spaces between two of the power pulses fed thereto, the power pulse immediately following that input signal is inhibited from flowing to the output of the magnetic amplifier. It is clear, therefore, that at the start of the apparatus, and assuming that there is no input at the "set input," the magnetic amplifier 10 will have a continuous train of output pulses coinciding with the pulses of source PP–1, which train of pulses is fed to the input of complementing magnetic amplifier 11. Since the pulses from magnetic amplifier 10 will occur during the spaces between the pulses of source PP–2, there will be no output from magnetic amplifier 11 and hence no current flowing to the "output" of the device. There will be no feedback current through rectifier 12 and no current fed from the output of magnetic amplifier 11 through delay element 13 to the input of magnetic amplifier 10. This condition is shown in the first three vertical columns of waveforms of Figures 3A through C, where it is clear that there are pulses 32 in the output of magnetic amplifier 10 but no pulses in the output of magnetic amplifier 11. In applying the wave diagram of Figure 3 to the device of Figure 1, the last three horiontal columns of Figure 3 should be ignored for the present, as they are only applicable to the more complex form of the invention shown in Figure 2. In event a set input pulse 30 is received during the spaces between two of the power pulses from source PP–1, the output of magnetic amplifier 10 will be interrupted and no pulse will flow therein corresponding to the power pulse of source PP–1 which immediately follows the set input pulse 30. Consequently, during the space immediately following 30, there will be no input to magnetic amplifier 11 and consequently the pulse from source PP–2, which follows pulse 30 by two spaces, will be allowed to pass through magnetic amplifier 11 to the "output." This latter pulse is shown as the first of a group of four pulses bearing reference number 34 in Figure 3E. The first pulse 34 will be fed back through rectifier 12 to the input of magnetic amplifier 10 and will therefore interrupt the flow of the next following pulse from source PP–1 which is the second of the group of four pulses bearing reference number 33 in Figure 3A. Hence, during the period of this second pulse of the series designated as 33, there will be no input to magnetic amplifier 11 and it will have an output corresponding to the second pulse of the group designated by reference number 34. The second pulse of group 34, just mentioned, will be fed back through rectifier 12 with the same effect as the first pulse of the series and will cause a recycling operation producing all four pulses of group 34 in Figure 3E. This operation would normally continue indefinitely, except for the introduction of delay element 13 into the circuit. After a plurality of pulses have been fed back through rectifier 12, the same pulses will begin to appear at the output of delay element 13 and will cancel the next pulse passing through rectifier 12. Consequently, the feedback operation is terminated, whereupon in effect there is no input signal to amplifier 10 corresponding in time with the fourth pulse of the series designated 34. Hence, the next power pulse from source PP–1 will flow through the amplifier 10 and will establish the first pulse of group 35. This pulse is fed to the input of amplifier 11 and inhibits output from that amplifier, wherefore there is no feedback through path 12 and the apparatus remains in a stable state wherein there is a continuous train of output pulses from magnetic amplifier 10 but no output pulses from magnetic amplifier 11. This is clearly shown in Figure 3D, where the three pulses 35 represent output from magnetic amplifier 10, and it is noted that there are three corresponding spaces after the pulses 34 in Figure 3E showing the output of amplifier 11. This state of affairs continues until another "set input" pulse is received, at which time the same series of operation is repeated. If it be assumed that the next set input pulse is pulse 31 of Figure 3C and that another set input pulse 31*a* arrives before the termination of the delay period established by the set input pulse 31, it is possible to show that the apparatus is non-resettable. In response to set input pulse 31, the first pulse of the group 36 in Figure 3A is inhibited from flowing to magnetic amplifier 11. Consequently, the magnetic amplifier 11 will have an output pulse represented by the first pulse of the group 37 of Figure 3E. This first pulse will be fed through the feedback path comprising rectifier 12 to the input of the magnetic amplifier 10 and the process will repeat to produce a second pulse 37 which is fed back to arrive simultaneously with the set input pulse 31*a*. Hence the pulse 31*a* will not alter the operation of the device. It follows that the four pulses 37 will occur in the output of the device in exactly the same way as the four pulses 34 occurred in said output, notwithstanding the fact that an additional pulse 31*a* arrived prior to the end of the delay period.

It is noted that the output of the device of Figure 1 constitutes a series of four pulses, for example, the four pulses 34, in response to each set input pulse. If it is desired to have a continuous output instead of a series of output pulses, the more complex circuit of Figure 2 may be employed in which a non-complementing magnetic amplifier 26 is controlled by the output of magnetic amplifier 11. A non-complementing magnetic amplifier is one which produces a pulse in its output during a time period following a pulse at its input. In the absence of a pulse at the input, there is no pulse at the output. It may be assumed that the device of Figure 2 operates exactly the same way as the device of Figure 1 with the sole exception that the pulses 34 in Figure 3E energize the input of the non-complementing magnetic amplifier 26 and cause output pulses 38 in Figure 3F to appear during the four spaces following the four pulses 34. The outputs of amplifiers 11 and 26 are added together through buffers or rectifiers 27 and 28 and produce a combined output substantially as shown in Figure 3G. The combined output is the combination of the four pulses 34 with the four pulses 38. Figure 3H represents the output at the lefthand end of the delay element 13 of Figure 2. This results from the fact that the continuous output signals are delayed and produce a pulse approximately six time periods following the first pulse of the group, for example, the group 34.

Figure 4:
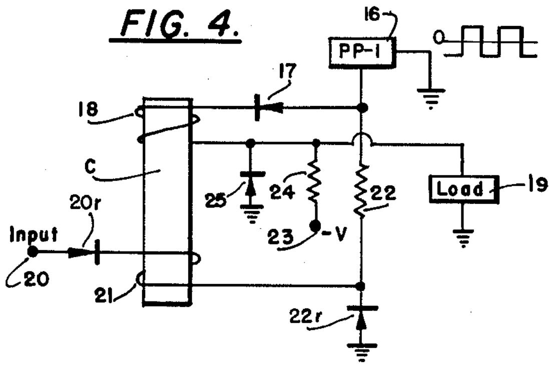
Figure 4 is a schematic diagram of a series type complementing magnetic amplifier, useful in the circuits shown in Figures 1 and 2.
Figure 4A:
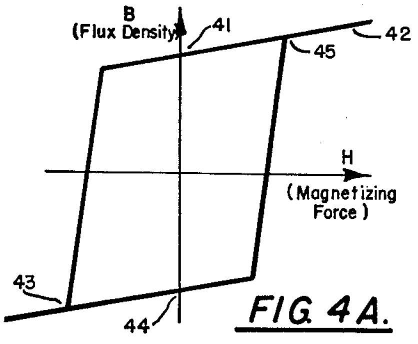
Fig. 4A is the hysteresis loop for the magnetic material employed in the cores.

Figure 4 is a schematic diagram of one type of magnetic amplifier that may be used in connection with the invention. The magnetic core C may be made of a variety of materials among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 4A). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coils on the core will be high.

The source 16, of power pulses PP–1, generates a train of equally spaced square wave pulses. If it be assumed that at the beginning of any given pulse the core has residual magnetism and flux density as represented on point 41 of the hysteresis loop of Figure 4A, the power pulse will drive the core from point 41 to saturation region 42. At the conclusion of the pulse the magnetization will return to point 41. Successive pulses from power source 16 will flow through rectifier 17, coil 18 and load 19, repeatedly driving the core from remanence point 41 to saturation region 42. During the interval in which the core is being driven from 41 to 42, the core is operating on a relatively saturated portion of the hysteresis loop, whereby the impedance of coil 18 is low. Hence, the power pulses will flow from source 16 to load 19, without substantial impedance. If, however, during the interval between two power pulses, a pulse is received at the input 20, it will pass through coil 21, resistor 22, source 16, to ground. This will magnetize the core negatively driving it from point 41 to point 43. At the conclusion of this negative pulse the core will return to negative remanence point 44. The next power pulse from source 16 is just sufficient to drive the core from point 44 to point 45. Since this is a relatively unsaturated portion of the hysteresis loop, the coil 18 will have high impedance during this pulse and the current flow will be very low. At the conclusion of that pulse the magnetization will return to positive remanence or zero value 41. If no signal appears on the input immediately following the last-named power pulse, the next power pulse will drive the core to saturation at point 42 and will give a large output at the load 19.

Consequently, it is clear that the magnetic amplifier of Figure 4 will feed large pulses to the load in response to each pulse from source 16, except that immediately after the receipt of any pulse on the input 20 the next power pulse will be blocked. This type of magnetic amplifier is known as a "complementing" one.

In order to avoid appearance at the load 19 of the small current which flows during the period that a power pulse is driving the core from point 44 to point 45, the parts 23, 24 and 25 may be employed. The negative source 23 passes a current greater than the said small current through resistor 24 and rectifier 25. Thus in the presence of the said small current, there is a net current in diode 25, and the cathode of 25 therefore remains substantially at ground potential during this current flow.

The flow of positive power pulses from source 16 through the coil 18 when the latter has high impedance will tend to induce a potential in winding 21 during the positive power pulse period. The potential thus induced in winding 21 tends to cause a flow of current through input source 20, winding 21, resistor 22, source 16, to ground. This flow of current is undesirable and is blocked since the positive pulse of source 16 is impressed (through resistor 22) upon the cathodes of rectifiers **20*r* and 22*r*, whereby these rectifiers are cut off and will not allow flow of current in the circuit of winding 21**.

The source 16 preferably goes negative during the space between positive power pulses; in other words, it preferably is a source of square wave alternating current. On the negative half cycle, the negative going excursion of source 16 cuts off rectifier 17 and prevents flow of current from input 20 through rectifier 17 and coil 18 to the load.

Figure 2:
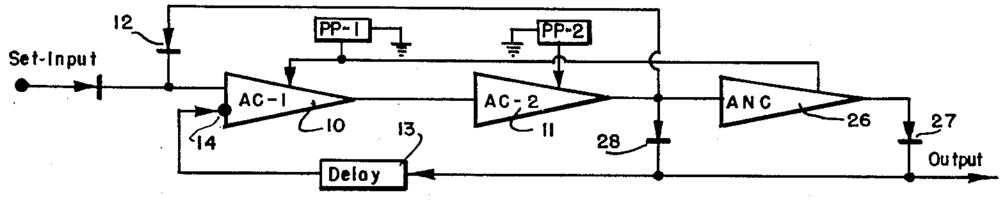
Figure 2 is a block diagram of an improved form of my delay flop.
Figure 3:
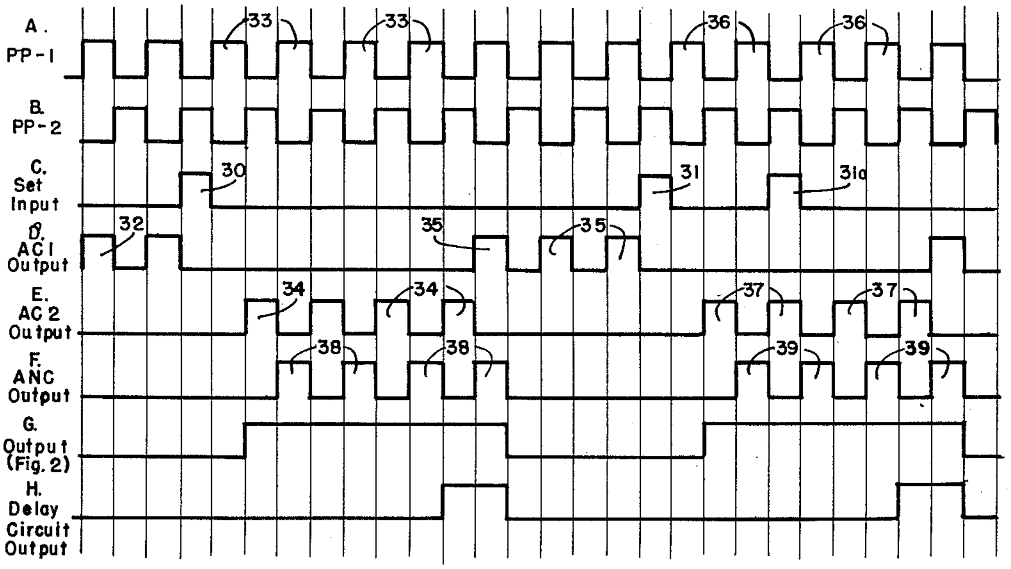
Figure 3 is a waveform diagram useful in explaining the operation of Figure 2.
Figure 5:
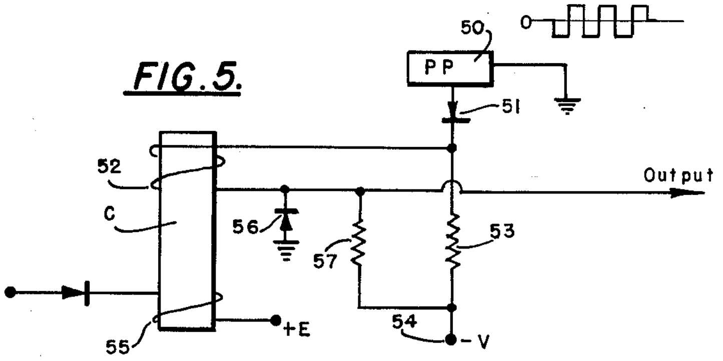
Figure 5 is a schematic diagram of a series type non-complementing magnetic amplifier of the type useful in connection with the third stage of Figure 2.

Figure 5 is a schematic diagram of a non-complementing magnetic amplifier that may be used in the third stage of Figure 2. It operates as follows: The power pulses from source 50 are positive as in the previous case and pass through rectifier 51, coil 52, resistor 57, to negative pole 54 which is below ground potential. If we assume that at the start of the first pulse the core was at point 44 on its hysteresis loop, Figure 4A, it will be driven to point 45. At the end of this pulse, it will return to zero value 41. At the conclusion of the first pulse, current will flow in the circuit from ground to rectifier 56, coil 52, resistor 53 to negative pole 54. This is a current flow through coil 52 in the opposite direction from that of the first pulse and drives the core negatively from point 41 to point 43. At the conclusion of this reverse pulse, the second power pulse will again drive the core positively from point 43 through point 44 to point 45, and from thence it will go to 41, after the conclusion of the second pulse. The next action will be another flow of current in the circuit from ground, rectifier 56, coil 52, resistor 53, to negative pole 54. Hence, the magnetization of the core will repeatedly traverse the hysteresis loop and the majority of the time the core will be operating on unsaturated portions of the hysteresis loop, consequently there will be substantially no output. If, however, an input signal is received in coil 55, at a time when the core is at point 41, the reverse current in the circuit ground 56—52—53 and 54 will not drive the core negatively to point 43 as usual. In such situation, there will be two opposite magnetizing forces on the core. On the one hand there will be a flow of current in the circuit ground to rectifier 56, coil 52, resistor 53, to negative pole 54, tending to apply a negative magnetizing force to the core. Also there will be an additional input current in coil 55 tending to apply a positive magnetizing force to the core. These two magnetizing forces will cancel each other and the core will remain at point 41 on the hysteresis loop. Consequently, the next power pulse will pass through rectifier 51 and coil 52 will drive the core to plus saturation point 42 on the hysteresis loop. The core is substantially saturated throughout this entire period, and therefore a large pulse output will appear. The operation of a non-complementing amplifier may be summarized by stating that there will be current that will drive the core around the hysteresis loop without substantial saturation and therefore without any substantial pulse output until there is a current flow through coil 55. This will stop the alternating magnetizations of the core, allowing the next power pulse to saturate the core and give a large output.

The source 50 preferably goes negative during the spaces between positive power pulses. In other words, it is a source of square wave alternating current. On the negative half cycle the rectifier 51 is cut off so that reverting current from source 54 will not enter thet generator 50 but will flow exclusively through coil 52 and rectifier 56.

Figure 6:
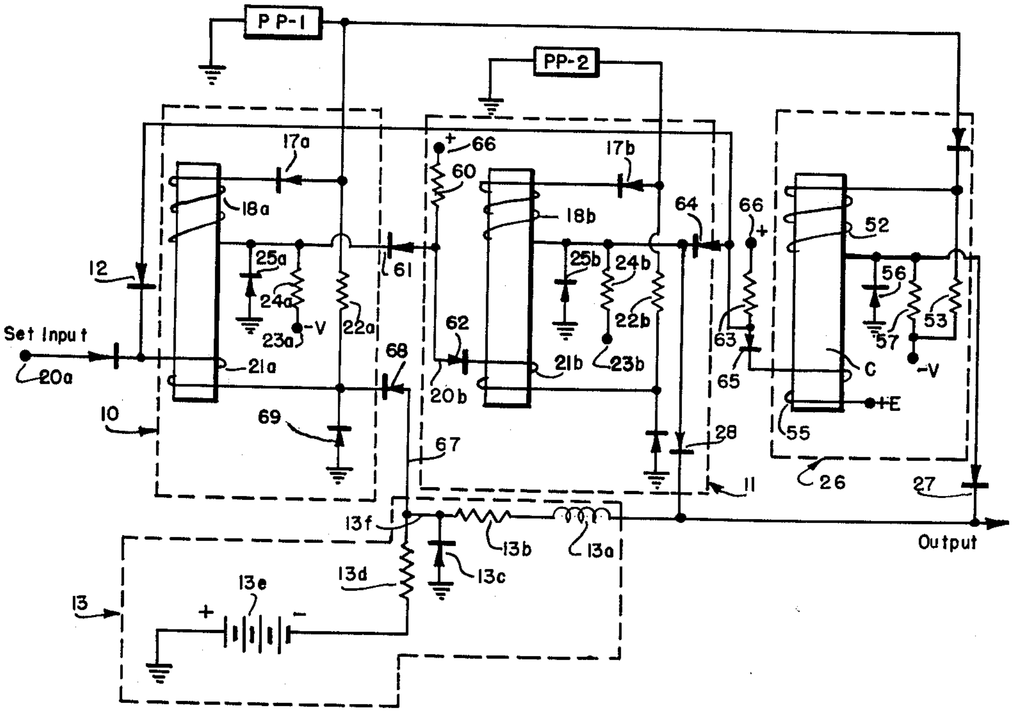
Figure 6 is a schematic diagram of the device shown in Figure 2.

Figure 6 is the schematic diagram of Figure 2 and shows the three magnetic amplifiers 10, 11 and 26 in detail.

The component parts of magnetic amplifier 10 bear the same reference numbers as the corresponding parts of Figure 4, except that in Figure 6 these reference numbers bear the subscript "*a*." Likewise, the corresponding parts of magnetic amplifier 11 and those of the magnetic amplifier of Figure 4 bear like reference numbers, except that in the case of Figure 6 the reference numbers bear the subscript "*b*." The parts of magnetic amplifier 26 and the magnetic amplifier of Figure 5 are identical and bear like reference numbers.

The overall mode of operation of Figure 6 is as follows: When no signal is being received on the "set input," the magnetic amplifier 10 will produce a series of output pulses which will flow from source PP–1 through rectifier 17*a*, coil 18*a* which has low impedance, to the cathode of rectifier 61. This will raise the potential of that cathode to a high positive value and allow current to flow from the positive source 66 through resistor 60, rectifier 62, coil 21*b*, resistor 22*b*, and source PP–2, to ground. This will revert the core of magnetic amplifier 11 and prevent any output therefrom. Hence, the current from source 66 will then flow through resistor 63, thence through rectifier 64, resistor 24*b* to negative pole 23*b*. This will cause the anode of rectifier 64 to fall to ground potential, and there will be no feedback through rectifier 12 to the input 20*a* of magnetic amplifier 10. There will be no input to the magnetic amplifier 26 and consequently no output therefrom. This situation will continue until a set input pulse is received at the "set input." The latter pulse will flow through coil 21*a*, resistor 22*a*, and source PP–1 to ground. This will revert the core during the spaces between two of the pulses from source PP–1 and consequently the coil 18*a* will now have high impedance and very little current will flow therethrough due to the next pulse from source PP–1. Hence, the cathode of rectifier 61 will not be raised in potential and current will now flow from positive pole 66, resistor 60, rectifier 61, resistor 24*a*, to negative pole 23*a*. Substantially all of the positive potential at source 66 will appear across the resistor 60 and substantially no current will flow from source 66 through the coil 21*b*. Hence, the second magnetic amplifier 11 will have no input which means that it will produce a series of output pulses corresponding to pulses 34 of Figure 3E. These pulses are fed back through rectifier 12 to the input of magnetic amplifier 10. Considering the first pulse of the group 34, it will flow through coil 21*a* and revert the core of magnetic amplifier 10 during the spaces between power pulses and render the coil 18*a* of high impedance to the next power pulse from source PP–1. Consequently, there will be no input to the magnetic amplifier 11 and it will produce in its output the second pulse of the group 34 which likewise will be fed back through rectifier 12 to the input of the magnetic amplifier 10. This will inhibit an output from amplifier 10 during the period of the next pulse from source PP–1 and therefore the next power pulse fed from source PP–2 to the second amplifier 11 will flow through the feedback circuit to the rectifier 12 and may be regarded as the third pulse of the group 34. It will render the coil 18*a* of high impedance and prevent an input to the second magnetic amplifier 11 which will produce in its output the fourth pulse of the group 34 which will flow through rectifier 12 to the input of coil 21*a*, but this last pulse 34 will not reset the core of magnetic amplifier 10 because a delayed pulse will now begin to appear as shown in Figure 3H through the delay element 13 and will be fed through the wire 67 and rectifier 68 to the righthand terminal of coil 21*a*. Hence, there will be simultaneous positive pulses arriving at coil 21*a*, one through the wire 20*a* in the right-hand direction and one through the wire 67 in the lefthand direction, and as these pulses obviously cancel each other there will be no input to the coil 21*a* during the period of the fourth pulse of group 34. Hence, the core of magnetic amplifier 10 will not be reverted during that period and pulses 35 will thereupon begin to occur at the output of magnetic amplifier 10. Since pulses are appearing at the output of 10, flowing to the input of magnetic amplifier 11, there will be no output from magnetic amplifier 11 and the device will have returned to its original state. The pulses in the output of magnetic amplifier 11 will raise the potential of the rectifier 64 and cause a flow of current through input winding 55 of magnetic amplifier 26 concurrently with each output pulse of magnetic amplifier 11. This will cause magnetic amplifier 26 to produce a series of output pulses 38 in response to the pulses 34. The rectifiers 27 and 28 in the outputs of amplifiers 26 and 11 will pass the groups of pulses 34 and 38 which combine to produce a substantially continuous output pulse. It is this continuous output pulse, shown, in Figure 3G, that flows into the delay element 13 and produces the delay circuit output pulses shown in Figure 3H.

As hereinabove stated, one important feature of the invention is the novel delay element 13. In delay element 13 battery 13*e* is normally positive at the lefthand terminal and negative at the right hand terminal. This battery causes current to flow from ground through rectifier 13*c*, resistor 13*d* and the battery 13*e*, back to ground. This tends to maintain the wire 13*f* at ground potential prior to the arrival of any pulse at 13*f* through the inductor 13*a* and resistor 13*b*. The first feedback pulse 34 in Figure 3E is applied to coil 13*a* and tends to cause current to flow therethrough and through resistor 13*b*. Due to the inductance of the coil 13*a* this feedback current builds up slowly and it may require a succession of several pulses, virtually any required number, before the current is built up to the point where it equals the current flowing in the path 13*c*—13*f*—13*d*—13*e*, due to the battery 13*e*, depending upon the pulse values and the selected circuit constants. Until the current through coil 13*a* is built up to the point where it equals the current in the aforesaid path due to the battery 13*e*, the wire 13*f* is held at substantially ground potential by the rectifier 13*c* which may be thought of as having substantially zero resistance while conducting. However, when the current through the coil 13*a* has built up due to a succession of pulses so that it is larger than the current flowing through wire 13*f* by reason of the battery, the potential of wire 13*f* is raised above ground, because the potential on the wire 13*f* due to the surge of current passing through the inductor 13*a* is positive and the rectifier 13*c* is connected in the wrong direction to allow this positive potential to pass. Note that the cathode of rectifier 13*c* is connected to wire 13*f*. Therefore, wire 13*f* will rise to a positive value as shown by Figure 3H, and the wire 67 connected to the righthand end of coil 21*a* is therefore raised to a positive potential substantially equal to the positive potential on the input wire 20*a* due to the last feedback pulse of group 34 fed through restifier 12. As these two positive potentials oppose each other simultaneously, there is no current flow in coil 21*a*.

The period of the delay element 13, when resistor 13*b* has a resistance value substantially in excess of zero, is given by the formula:

$$D=\frac{L}{R}\log_{\epsilon}\left[\frac{E}{E-IR}\right]$$

where D is the time period of delay element 13; where R is the resistance of resistor 13*b*; where L is the inductance of inductor 13*a*; where $\log_{\epsilon}$ [ ] indicates the logarithm to the Naperian base, 2.71828 . . .; where I is the sum of the currents in rectifiers 13*c* and 69; and where E is the step voltage at the input of the inductor 13*a*. Where, however, the resistance of resistor 13*b* is substantially zero, a situation which is preferred in many cases, the delay is given by the following formula:

$$D=\frac{LI}{E}$$

The symbols in this formula have the same definitions as were employed in the preceding formula.

The latter case, namely the case where resistance of resistor **13*b* is substantially zero, is preferred in many cases because of the low voltage loss produced in the resistor 13*b*** and because the delay characteristic is linear.

It will be understood that the number of set output pulses per set input pulse may be readily varied to achieve a predetermined value of set output duration by changing one or more of the above elements of the circuit. In the same way a suitable selector switch will provide a selection from among a predetermined number of values in an operating apparatus.

The following mathematical analysis will illustrate the function of rectifier **13*c* in the delay means 13 of Figure 6. For convenience, assume that delay means 13 is isolated from the remainder of the circuit. The current in the path: ground, 13*c*, 13*d*, 13*e*, will maintain the cathode of 13*c* at ground potential if the current entering 13*a* from the right is less than the current in the path: ground, 13*c*, 13*d*, 13*e***, that is if:

$$i_L < \frac{V_e}{R_d}$$

where:

$i_L$=current in **13*a***
$V_e$=potential of **13*e***
$R_d$=resistance of **13*d***

Consider now effect of the application of a positive potential to the righthand terminal of **13*a*. The current in 13*a*** will be in accordance with:

$$i_L = \frac{E}{R_b}\left(1-\epsilon^{-\frac{t}{\tau}}\right) = \frac{E}{R_b}\left(1-\epsilon^{-\frac{R_b t}{L}}\right)$$

where:

$i_L$=current in **13*a***
$E$=value of the positive potential applied to **13*a***
$R_b$=resistance of **13*b***
$L$=inductance of **13*a***
$t$=time counted from the moment of application of the positive potential
$\epsilon$=2.71828 . . . , the Naperian base If $R_b$ is substantially zero, we have the expression:

$$i_L = \frac{Et}{L}$$

where the parameters are as above. Notice that we have $i_L$ increasing continuously in each case. In the first case, we have an asymptotic approach to the value:

$$\lim_{t\to\infty} i_L = \frac{E}{R_b}$$

and in the second case, $i_L$ increases without limit. However, we now notice that if the value of $i_L$ exceeds the value of $V_e/R_d$, that is if:

$$i_L > \frac{V_e}{R_d}$$

the potential of the cathode of **13*c* is no longer zero. The relative magnitudes of the circuit components now become of crucial importance. If it be assumed that the potential of 13*e*** is very much gerater than the applied positive potential, that is:

$$V_e >> E$$

and if:

$$\frac{E}{R_b} > \frac{V_e}{R_d}$$

so that the current $i_L$ will in fact eventually exceed the value $V_e/R_d$, it will be found that $R_d$ must have large resistance. This means that a trivial increase in the current in $R_d$ will produce a large change in the potential of the junction of **13*d* and 13*c*. Thus, when the current in 13*a* exceeds the clamp current, no further substantial increase in the current in 13*a*** will occur, and in accordance with the equation:

$$E_L = L\frac{di_L}{dt}$$

where:

$E_L$=potential drop across **13*a***
$L$=inductance of **13*a***
$\frac{di_L}{dt}$=rate of change of $i_L$ with respect to time the potential drop in **13*a* becomes substantially zero and it will be found that the potential of the cathode of 13*c*** may be determined from the relationship:

$$E_c = E\frac{R_d}{R_d + R_b}$$

where $E_c$ is the potential at the cathode of **13*c***. Note that if $R_b$ is zero, $E_c=E$.

To complete the discussion, let us determine the delay time, which is now obviously the time required for the current in **13*a*** to increase to the value $V_e/R_d$. From the above discussion the following results:

$$i_L = \frac{E}{R_b}\left(1-\epsilon^{-\frac{R_b t}{L}}\right) = \frac{V_e}{R_d}$$

transposing terms we get:

$$\frac{V_e}{E}\frac{R_b}{R_d} = 1-\epsilon^{-\frac{R_b t}{L}}$$

$$1-\frac{V_e}{E}\frac{R_b}{R_d} = \epsilon^{-\frac{R_b t}{L}}$$

$$\frac{ER_d - V_e R_b}{ER_d} = \epsilon^{-\frac{R_b t}{L}}$$

$$\epsilon^{\frac{R_b t}{L}} = \frac{ER_d}{ER_d - V_e R_b}$$

taking the Naperian logarithm of each side:

$$t\frac{R_b}{L} = \log_\epsilon\left[\frac{ER_d}{ER_d - V_e R_b}\right]$$

or $$t = \frac{L}{R_b}\log_\epsilon\left[\frac{E}{E - R_b\frac{V_e}{R_d}}\right]$$

which is identified with the first-named formula mentioned hereinabove by equating:

$$D = t$$

$$I = \frac{V_e}{R_d}$$

$$L = L$$

$$R = R_b$$

Considering the element 13 in the combination of Figure 6, it will be apparent that resistor **22*a* and rectifier 69** comprise an additional current clamp which must be overcome so that in the delay equation the term $$\frac{V_e}{R_d}$$

becomes the sume of the currents in elements **13*c* and 69**.

Figure 9:
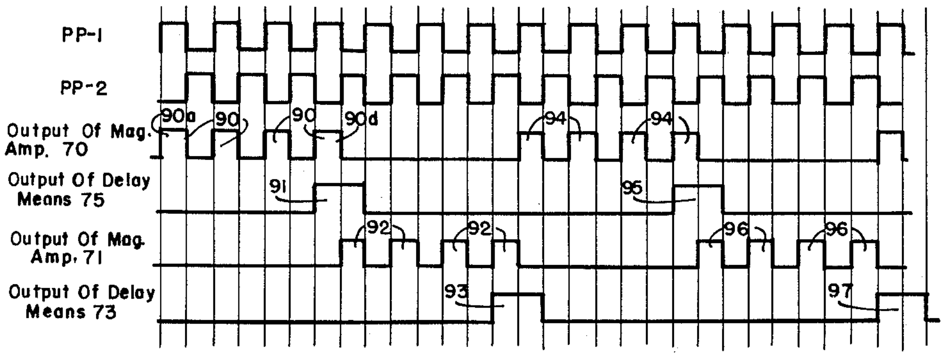
Figure 9 is a timing wave diagram for the device of Figures 7 and 8.
Figure 7:
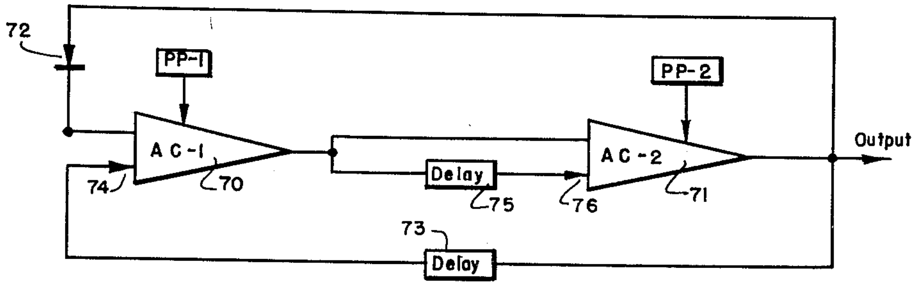
Figure 7 is a block diagram of a modified form of the invention.
Figure 8:
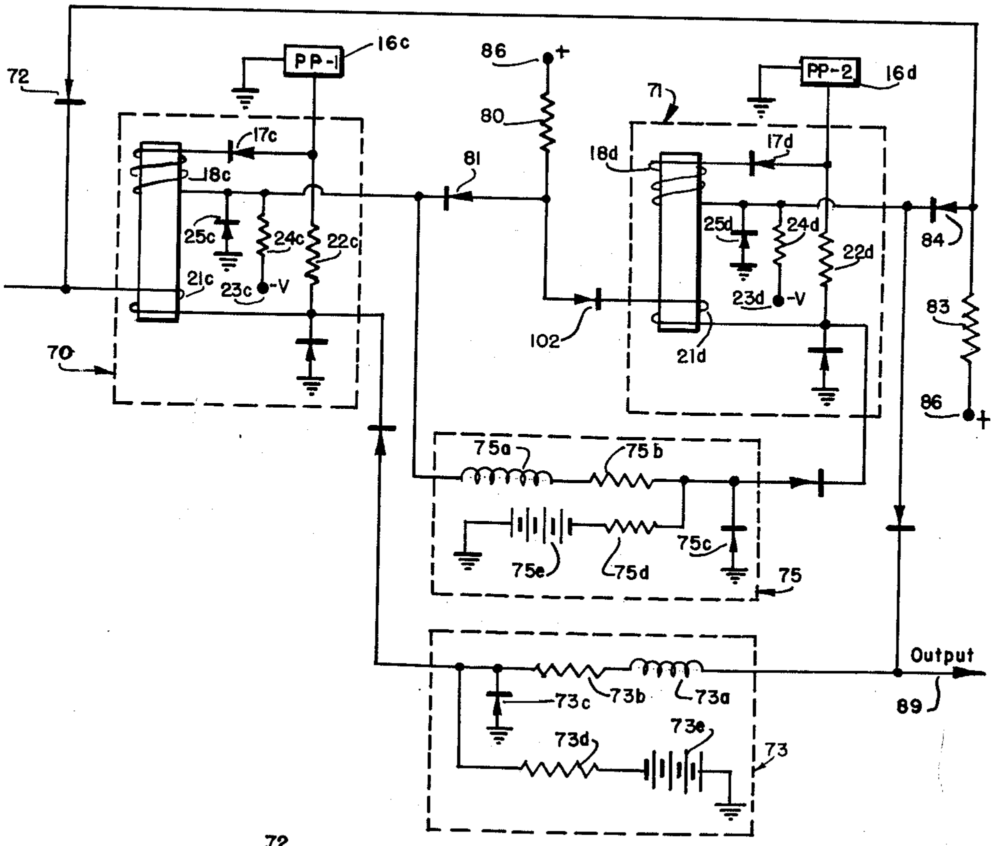
Figure 8 is a schematic diagram of the device of Figure 7.

Figure 7 is a block diagram of a multivibrator circuit which is substantially identical with the circuit of Figure 1, except for the addition of an additional delay means 75. Parts 70, 71, 72, 73 and 74 of Figure 7 correspond with parts 10, 11, 12, 13 and 14 respectively of Figure 1. The "set input" is of course omitted in connection with Figure 7. Figure 8 is a schematic diagram of Figure 7, and Figure 9 is a timing diagram for the device of Figures 7 and 8.

In Figure 7, the complementing magnetic amplifier 70 receives pulses from source PP–1 which are out of phase with the pulses from source PP–2 which feeds the complementing magnetic amplifier 71. Inasmuch as a complementing magnetic amplifier, in the absence of an input pulse, produces an output pulse in response to each power pulse received thereby, it is clear that the first power pulse fed to complementing magnetic amplifier 70 will flow therethrough to the input of complementing magnetic amplifier 71. In other words, the first pulse from source PP–1 will flow through the complementing magnetic amplifier 70 and appear in the output of that amplifier as the first pulse 90*a* of a group of four pulses 90 of Figure 9. This pulse 90*a* appears at the input of complementing magnetic amplifier 71 prior to the first pulse from source PP–2 and therefore inhibits any output from complementing magnetic amplifier 71. Since there is no output from complementing magnetic amplifier 71 flowing through rectifier 72 to the input of complementing magnetic amplifier 70, the latter will continue to produce output pulses and as shown in Figure 9, a total of four will be produced before the circuit operates to terminate those pulses as will hereinafter appear. The pulses 90 leaving the complementing magnetic amplifier 70 flow to the delay means 75 and after a predetermined delay, an output pulse appears at the input 76 as pulse 91. This pulse 91 operates to cancel the effect of the fourth pulse 90*d* flowing from the output of complementing magnetic amplifier 70 and therefore in effect the fourth pulse 90*d* does not inhibit the output of complementing magnetic amplifier 71 and it begins producing output pulses as shown at 92 on Figure 9. These pulses are fed through rectifier 72 to the input of complementing magnetic amplifier 70 and inhibits further output from that magnetic amplifier for the time being. The pulses 92 also flow through delay means 73 and form a pulse 93 which is fed to input 74 of complementing magnetic amplifier 70 and cancels the effect of the fourth pulse 92 which is fed through rectifier 72 to an input of complementing magnetic amplifier 70. Therefore, the fourth pulse 92 is ineffective to inhibit output from complementing magnetic amplifier 70 and it begins producing output pulses 94. These output pulses pass to the input of complementing magnetic amplifier 71 and inhibit outputs therefrom and they also pass through the delay means 75 and produce a pulse 95 which is fed to input 76 and which cancels the effect of the fourth pulse 94 so that complementing magnetic amplifier 71 may again produce output pulses 96. These pulses pass through rectifier 72 and inhibit output from complementing magnetic amplifier 70. These pulses also flow through delay means 73 and produce a pulse 97 at input 74 which cancels the effect of the fourth pulse 96, wherefore the complementing magnetic amplifier 70 will again produce output pulses. The foregoing sequence of operation will continue indefinitely and it is noted that the output of the device consists of groups of pulses 92 and 96, etc. Each group of pulses may be regarded as a single output of the device in which event the device produces a series of spaced signals of which the four pulses 92 constitute one signal and the four pulses 96 constitute another signal, etc.

Figure 8 illustrates in greater detail the circuit of Figure 7. The complementing magnetic amplifier 70 has the same circuit as that of Figure 4 and bears the same reference numbers, except that in Figure 8 the subscript *c* has been added. The complementing magnetic amplifier 71 likewise is identical with the one of Figure 4 and bears like reference numbers, except that the subscript *d* has been added.

The delay element 73 of Figure 8 is similar in construction and mode of operation to the delay element 13 of Figure 6. The parts represented by reference numbers 13*a*, 13*b*, 13*c*, 13*d* and 13*e* of Figure 6, correspond respectively to parts 73*a*, 7*b*, 73*c*, 73*d* and 73*e* of Figure 8. Likewise, the delay element 75 of Figure 8 is similar in construction and mode of operation to the delay means 13 of Figure 6 and the parts designated by reference numbers 13*a*, 13*b*, 13*c*, 13*d* and 13*e*, of Figure 6, correspond respectively to the parts 75*a*, 75*b*, 75*c*, 75*d* and 75*e* of Figure 8.

If we now assume that the parts of Figure 8 are all idle and the two sources 16*c* and 16*d* of power pulses are energized for the first time and begin producing pulses as shown in Figure 9, the result will be as follows. If we assume that the core of the magnetic amplifier 70 is at point 41 on its hysteresis loop (see Figure 4A), the first power pulse from PP–1 will flow through rectifier 17*c*, coil 18*c*, to the cathode of rectifier 81. Since the coil 18*c* has low impedance, the potential of the cathode of rectifier 81 will be raised to a high positive value so that this rectifier is in effect cut off and current may flow from the positive pole of source 86 through resistor 80, coil 21*d*, resistor 22*d*, the source PP–2, to ground. This will revert the core of magnetic amplifier 71 so that coil 18*d* has high impedance and the next power pulse from source PP–2 will not pass through coil 18*d* due to the high impedance thereof. Hence, the current from positive pole 86 flowing through resistor 83 finds a low impedance path through rectifier 84, resistor 24*d*, to negative pole 23*d* and therefore there is no pulse produced at input coil 21*c* of magnetic amplifier 70. Hence, this magnetic amplifier continues to have pulses in its output and a series of four pulses 90 consequently appear. The pulses 90 flow through the delay means 75 which operates as has been hereinabove described and produces an output pulse 91 concurrently with the pulse 90*d*. The pulse 91 applied to one end of the winding 21*d* and the pulse 90*d* being applied to the other end of coil 21*d* results in a cancellation of the effects of these two pulses and so the core of magnetic amplifier 71 is not reverted during the period of pulse 90*d* and the next pulse from source PP–2 will find the coil 18*d* with low impedance and will flow therethrough to the output 89. It will also raise the potential of the cathode of rectifier 84 to a high positive value and cut off this rectifier so that current may now flow from positive pole 86 through resistor 83 to the coil 21*c*, thence to resistor 22*c*, source PP–1, to ground. This will revert the core of magnetic amplifier 80 and stop output therefrom. Since magnetic amplifier 70 will not have an output, the current from positive pole 86 flowing through resistor 80 now passes through rectifier 81, resistor 24*c* to negative pole 23*c* and hence the lower end of resistor 80 is no longer at a high positive value and substantially no current will therefore flow in coil 21*d*. As a result, the magnetic amplifier 71 will continue to produce output pulses which will continue to flow to coil 21*c* and revert the core of magnetic amplifier 70. The pulses 92 from the output of magnetic amplifier 81 also flow through delay means 73 to produce delayed pulse 93 which appears at the lower end of coil 21*c* concurrently with the fourth pulse 92, and consequently the effect of the fourth pulse 92 is cancelled wherefore the magnetic amplifier 70 will again produce output pulses. This cycle of operation will repeat itself indefinitely and consequently there will be spaced groups of pulses at the output 89 such as the group 92, the group 96, etc.

Figure 10:
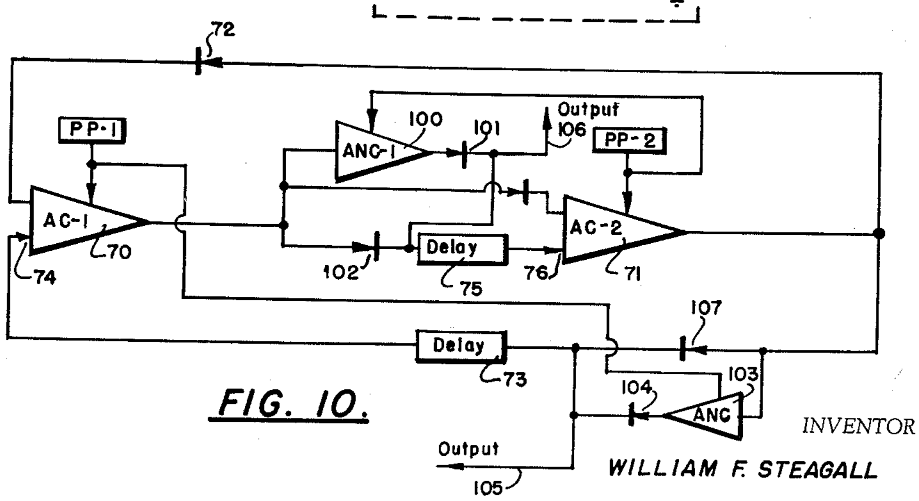
Figure 10 is a block diagram of a modified form of Figure 7.

In event it is desired to have a single pulse in the place of each group of four pulses so that in effect the four pulses 92 would result in a single uninterrupted pulse, the apparatus of Figure 10 may be employed. Figure 10 is identical with the device of Figures 7 and 8, except that there has been added suitable means for filling in the spaces between the output pulses of the device of Figure 8. For example, the four pulses 92 in the output of the device of Figure 7 have spaces therebetween. The device of Figure 10 employs means for filling the spaces between the pulses 92. The means employed for that purpose is substantially identical to the means employed in connection with Figure 2 for filling in the spaces between the pulses of Figure 1. Such means may reside in employing a non-complementing magnetic amplifier 103 and a rectifier 104 in series with each other and bridged across the rectifier 107. The non-complementing magnetic amplifier 103 is identical to the non-complementing magnetic amplifier of Figure 5 and is driven from the source of power pulses PP–1 which drives the complementing magnetic amplifier 79. The non-complementing magnetic amplifier 103 is of course fed with spaced pulses 92 and produces during the spaces between these pulses additional pulses which are added to the pulses 92 through the rectifier 104 and therefore appear at the output. Hence, the output is a single continuous pulse of the duration of eight of the pulses 92.

If desired, an additional output 106 may be added and if it is desired for this output to have a series of prolonged continuous pulses instead of a series of groups of short pulses, the non-complementing magnetic amplifier 100 together with rectifier 101 may be bridged across the rectifier 102, in which case the non-complementing magnetic amplifier 100 is fed by pulses from source PP–2. With this apparatus, the non-complementing magnetic amplifier 100 will be fed by the pulses 90, 94, etc. of Figure 9 and will produce pulses through recitfier 101 during the intervals between the pulses 90 and also further pulses during the intervals between pulses 94, so that these two groups of pulses 90 and 94 result in two prolonged pulses.

Other forms of magnetic amplifiers may be substituted for the amplifiers of Figures 1, 2, 6, 7, 8 and 10, and for possible substitutes reference is made to prior copending applications of my assignee as follows: Theodore H. Bonn and Robert D. Torrey, Serial No. 402,858, filed January 8, 1954, entitled "Signal Translating Device"; and John Presper Eckert, Jr., and Theodore H. Bonn, Serial No. 382,180, filed September 24, 1953, now Patent No. 2,892,998, entitled "Signal Translating Device."

While I have disclosed the preferred form of my invention in Figure 6 and described certain modifications threeof in connection with Figures 7 and 8, it is understood that still other and further modifications may be made without departing from the scope of my invention which is defined in generic terms in the appended claims.

Having thus described my invention, I claim:

1. In combination, a first magnetic amplifier having an input and an output, a second magnetic amplifier having an input connected to the output of said first amplifier, a feedback circuit connecting the output of said second amplifier to the input of said first amplifier, a second circuit connected to the output of said second amplifier for the supply of pulses to said first amplifier, said second circuit comprising delay means which will supply a delayed pulse to the input of the first amplifier which will cancel the effect of a pulse fed through said feedback circuit.

2. The combination set forth in claim 1, said delay means comprising a rectifier and a source of potential in series for establishing flow of current of given value, and an inductor through which the signal to be delayed flows and builds up a current, and means connecting the inductor to the source of potential so that there is no output current from the delay means until the signal current through the inductor builds up to a value in excess of said given value.

3. The combination set forth in claim 1, in which said amplifiers are complementing magnetic amplifiers.

4. In combination, a first complementing magnetic amplifier supplied with power pulses of a first phase and having an input and an output, a second complementing magnetic amplifier supplied with power pulses of a second phase opposite to said first phase, and having an input connected to the output of said first amplifier, an output for said second amplifier, feedback circuit means for conveying output from said second amplifier to the input of said first amplifier and circuit means for conveying delayed output pulses from said second amplifier and causing them to cancel feedback pulses fed by said feedback circuit to thus cause the first complementing magnetic amplifier to start producing pulses from its output.

5. The combination set forth in claim 4, said circuit means for conveying delayed pulses comprising an element for building up current without effective output until said buildup reaches a predetermined level.

6. The combination set forth in claim 5, said element comprising an inductor.

7. A pulse type magnetic amplifier delay (flop) comprising a first complementing magnetic amplifier energized by first phase power pulses and having an input and an output, a second complementing magnetic amplifier energized by second phase power pulses having an input connected to the output of said first amplifier, said second amplifier having two output circuits connected to the input of said first amplifier to produce a series of output pulses, one of said circuits having a delay element as a part thereof and means responsive to said delay element whereby the number of output pulses in response to a single input pulse is limited.

8. The combination set forth in claim 7, said delay element comprising an inductor.

9. The combination set forth in claim 7, said delay element comprising an inductor, a resistor and a source of power in series, one terminal of said inductor being connected to the output of said second amplifier and the junction of said inductor and said resistor being connected to an input of said first amplifier, and a rectifier, said junction being grounded through said rectifier.

10. In combination, two complementing magnetic amplifiers each having its output connected to the input of the other, a separate branch connected from the output of the second amplifier to the input of the first, said branch connection containing a delay means therein, a non-complementing magnetic amplifier having its input connected to the output of said second amplifier, the second and third amplifiers having their outputs combined.

11. The combination set forth in claim 10 having two sources of spaced power pulses with the pulses of each source occurring during the spaces between pulses of the other source, one of said sources supplying power pulses to the first and third amplifiers and the other source supplying pulses to the second amplifier.

12. In combination, a first complementing magnetic amplifier having an input and an output, a second complementing magnetic amplifier having its input connected to the output of said first amplifier, a non-complementing magnetic amplifier having its input connected by a junction to the output of said second amplifier, separate branch circuit paths connected between said junction and said input to said first amplifier and arranged so that concurrent pulses in the outputs of the branch circuits cancel each other, one of said branch paths having a delay means therein, rectifier means connecting the outputs of said second and third amplifiers to the last-named branch path, means for generating first and second trains of power pulses that are out of phase with each other, and means for feeding the first train to the first and third-named magnetic amplifiers and the second train to the second-named magnetic amplifier.

13. The combination of claim 12 including a set input to the first-named magnetic amplifier whereby the combination will act as a delay flop.

14. The combination of claim 12 in which the connection between the output of the first magnetic amplifier and the input of the second one includes two branch paths one of which includes delay means, the two branch paths being arranged so that concurrent pulses in their outputs cancel each other; whereby the combination acts as a multivibrator.

15. The combination of claim 4 having a set input for the first complementing magnetic amplifier, whereby the device will function as a delay flop.

16. The combination of claim 4 in which the connection between the output of the first complementing magnetic amplifier to the input of the second one includes two branch paths one of which includes delay means, said paths being arranged so that concurrent pulses in their outputs cancel; whereby the combination functions as a multivibrator.

17. In combination, first and second magnetic amplifiers, means connecting the output of the first to the input of the second magnetic amplifier, and feedback means connecting the output of the second magnetic amplifier to the input of the first including delay means for stopping the feedback signals after a predetermined plurality of pulses have been fed back.

18. In combination, first and second complementing magnetic amplifiers, means connecting the output of the first to the input of the second magnetic amplifier, and feedback means connecting the output of the second magnetic amplifier to the input of the first including delay means for stopping the feedback signals after a predetermined plurality of pulses have been fed back.

19. The combination of claim 18 including a non-complementing magnetic amplifier fed by the output of the second magnetic amplifier and having its output connected to supplement that of the second magnetic amplifier.

20. The combination of claim 17 having means to stop the signals fed by the first to the second magnetic amplifier after a predetermined plurality of pulses, whereby the apparatus will act as a multivibrator.

21. The combination of claim 17 having an input terminal connected to the input of the first magnetic amplifier whereby the apparatus will act as a delay flop.

22. In combination, first and second pulse type complementing amplifiers, each of said amplifiers having an input and an output, means coupling the output of said first amplifier to the input of said second amplifier, first feedback means for coupling the output of said second amplifier to the input of said first amplifier whereby pulses appearing at the output of said second amplifier are operative to control the output state of said first amplifier, and second feedback means including delay means for coupling the output of said second amplifier to the input of said first amplifier whereby pulses appearing at the output of said second amplifier are operative, after a preselected delay time, to further control the output state of said first amplifier, said second feedback and delay means comprising a feedback line, means for normally clamping said line at a preselected reference potential, and inductor means for coupling pulses from the output of said second amplifier to said clamped feedback line thereby to alter the potential of said line from its clamped reference potential after said preselected delay time.

23. In combination, first and second pulse type complementing amplifiers, first means coupling the output of said first amplifier to the input of said second amplifier whereby pulses appearing at the output of said first amplifier are operative to control the output state of said second amplifier, second means coupling the output of said second amplifier to the input of said first amplifier whereby pulses appearing at the output of said second amplifier are operative to control the output state of said first amplifier, said second means comprising first and second separate feedback paths each of which is operative to carry pulses from the output of said second amplifier to the input of said first amplifier, said first feedback path including delay means therein for delaying the application of feedback signals to said first amplifier via said first feedback path for a predetermined time interval, whereby pulses appearing at the output of said second amplifier are fed to said first amplifier only via said second feedback path during said predetermined time interval whereafter feedback signals are fed to said first amplifier via both said first and second feedback paths.

24. The combination of claim 23 wherein said first and second feedback paths are so connected to the input of said first amplifier that signals fed via both said paths effectively cancel one another at the input of said first amplifier, whereby there is a resultant signal at the input of said first amplifier during said predetermined time interval whereafter no resultant signal appears at the input of said first amplifier.

25. In combination, first and second pulse type complementing amplifiers, means coupling the output of said first amplifier to the input of said second amplifier, and a pair of separate feedback paths coupling the output of said second amplifier to the input of said first amplifier, one of said feedback paths including delay means whereby, in response to the occurrence of output pulses at the output of said second amplifier, feedback pulses are initially coupled to said first amplifier via the other of said feedback paths whereafter a delayed pulse coupled via said one feedback path cancels pulses coupled via said other feedback path thereby to reduce the resultant feedback signal at the input of said first amplifier to substantially zero after elapse of a predetermined time interval.

26. In combination, first and second pulse type amplifiers, means for coupling the output of said first amplifier to the input of said second amplifier thereby to control the output state of said second amplifier, and means including a delay element for coupling the output of said second amplifier to the input of said first amplifier whereby pulses appearing at the output of said second amplifier vary the output state of said first amplifier after a predetermined time interval, said last-named means comprising an inductor having one end thereof coupled to the output of said second amplifier and the other end thereof coupled to the input of said first amplifier, and potential clamp means coupled to said other end of said inductor for maintaining said other end at a predetermined reference potential until pulses fed from the output of said second amplifier via said inductor raise the potential at the other end of said inductor above said reference potential thereby to change the input to said first amplifier.

27. In combination, a pair of complementing magnetic amplifiers, means coupling the output of each of said amplifiers to the input of the other of said amplifiers whereby the output of each of said amplifiers controls the input of the other of said amplifiers, said last-named means including an inductor connected between the output of one of said amplifiers and the input of the other said amplifier for imposing a time delay between the occurrence of an output from said one amplifier and its corresponding input control of said other amplifier, and potential clamp means coupled to the junction of said inductor and the input of said other amplifier for maintaining said junction at a preselected reference potential until an output signal from said one amplifier passing via said inductor raises said junction from its clamped reference potential.

References Cited in the file of this patent

UNITED STATES PATENTS

| | | |
|---|---|---|
| 2,631,232 | Baracket | Mar. 10, 1953 |
| 2,680,149 | Nixon | June 1, 1954 |
| 2,709,798 | Steagall | May 31, 1955 |
| 2,727,143 | Slutz | Dec. 13, 1955 |
| 2,774,956 | Bonn | Dec. 18, 1956 |
| 2,783,456 | Steagall | Feb. 26, 1957 |
| 2,834,006 | Kaufmann | May 6, 1958 |